US012811375B2

(12) United States Patent
Ishiba et al.

(10) Patent No.: US 12,811,375 B2
(45) Date of Patent: Nov. 24, 2026

(54) ROUTE RESTRICTING MEMBER

(71) Applicant: YAZAKI CORPORATION, Tokyo (JP)

(72) Inventors: Raphaer Ishiba, Makinohara (JP); Hiroki Goto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 219 days.

(21) Appl. No.: 19/001,362

(22) Filed: Dec. 24, 2024

(65) Prior Publication Data

US 2025/0233393 A1 Jul. 17, 2025

(30) Foreign Application Priority Data

Jan. 17, 2024 (JP) ................................ 2024-005346

(51) Int. Cl.
*H02G 3/04* (2006.01)
*B60R 16/02* (2006.01)

(52) U.S. Cl.
CPC ........ *H02G 3/0437* (2013.01); *B60R 16/0207* (2013.01); *B60R 16/0215* (2013.01); *H02G 3/0481* (2013.01)

(58) Field of Classification Search
CPC ................ H02G 3/0437; H02G 3/0481; B60R 16/0207; B60R 16/0215
See application file for complete search history.

(56) References Cited

U.S. PATENT DOCUMENTS

| | | | | |
|---|---|---|---|---|
| 9,536,639 | B2 * | 1/2017 | Yamamoto | H01B 7/025 |
| 11,904,781 | B2 * | 2/2024 | Fujikura | H02G 3/32 |
| 2023/0406239 | A1 * | 12/2023 | Saito | B60R 16/0215 |

FOREIGN PATENT DOCUMENTS

| | | | |
|---|---|---|---|
| JP | 2015-143570 | A | 8/2015 |
| JP | 2015-154574 | A | 8/2015 |
| JP | 2016-039752 | A | 3/2016 |
| JP | 2022-69307 | A | 5/2022 |

* cited by examiner

*Primary Examiner* — Paresh Paghadal
(74) *Attorney, Agent, or Firm* — KENEALY VAIDYA LLP

(57) ABSTRACT

A route restricting member restricts a path along which an electric wire is routed. The route restricting member includes a sheet-shaped first sheet member including a first peak portion and a first valley portion that extend in an axial direction of the electric wire and are alternately connected on an outer surface in a direction intersecting the axial direction, and a sheet-shaped second sheet member including a second peak portion and a second valley portion that extend in the axial direction and are alternately connected on an outer surface in the intersecting direction. The second sheet member includes a fitting extension portion extending toward the first sheet member in the axial direction and fitted to the outer surface of the first sheet member.

4 Claims, 5 Drawing Sheets

ROUTE RESTRICTING MEMBER

CROSS-REFERENCE TO RELATED APPLICATIONS

This application is based on and claims priority under 35 USC 119 from Japanese Patent Application No. 2024-005346 filed on Jan. 17, 2024, the contents of which are incorporated herein by reference.

TECHNICAL FIELD

The present disclosure relates to a route restricting member.

BACKGROUND ART

In the related art, a route restricting member has been proposed to restrict bending of an electric wire. PTL 1 describes a route restricting member that covers a range spanning more than half of an outer periphery of an exterior member such as a corrugated tube, which covers an outer periphery of an electric wire, in a circumferential direction of the exterior member, that extends along a length direction of the exterior member, and that restricts a path along which the electric wire is routed.

CITATION LIST

Patent Literature

Patent Literature 1: JP2022-69307A

SUMMARY OF INVENTION

However, since the route restricting member cannot cover an entire region of the electric wire in the circumferential direction, the route restricting member cannot be directly attached to the electric wire. The route restricting member is attached to the electric wire by using the exterior member such as the corrugated tube as described above. Therefore, the route restricting member tends to have an increased number of components, and in addition, there is a risk that a manufacturing process becomes more complicated and a manufacturing cost is increased. The route restricting member can be attached only to an electric wire having a preset diameter, and it is necessary to manufacture the route restricting member in accordance with the diameter of the electric wire, which may increase the manufacturing cost.

The present disclosure has been made in view of the above circumstances, and an object of the present disclosure is to provide a route restricting member that prevents an increase in the number of components and restricts, by a simple structure, a path along which an electric wire is routed.

In order to achieve the above object, a route restricting member according to the present disclosure has the following features.

The route restricting member restricts a path along which an electric wire is routed. The route restricting member includes a sheet-shaped first sheet member including a first peak portion and a first valley portion that extend in an axial direction of the electric wire and are alternately connected on an outer surface in a direction intersecting the axial direction, the first sheet member being wound to cover an outer periphery of a part of a predetermined portion of the electric wire; and a sheet-shaped second sheet member including a second peak portion and a second valley portion that extend in the axial direction and are alternately connected on an outer surface in the intersecting direction, the second sheet member being wound to cover an outer periphery of another part of the predetermined portion of the electric wire, and being fitted to the first sheet member. The second sheet member includes a fitting extension portion extending toward the first sheet member in the axial direction and fitted to the outer surface of the first sheet member.

According to the present disclosure, a first peak portion and a first valley portion extending in an axial direction are alternately connected on an outer surface of a first sheet member in an intersecting direction, and a second peak portion and a second valley portion extending in the axial direction are alternately connected on an outer surface of a second sheet member in the intersecting direction. Therefore, it is possible to restrict a path along which an electric wire is routed, including restricting bending of the electric wire and the like. Since the outer surface of the first sheet member and the outer surface of the second sheet member are configured as described above, it is possible to cope with chipping from flying stones or the like, for example, when the electric wire is routed under a floor of a vehicle such as an automatic vehicle, by adjusting an interval between the adjacent peak portions. Since the first sheet member and the second sheet member are configured to be simply wound around the electric wire, the number of components can be reduced as compared with the related art in which an exterior member and a route restricting member are provided. As described above, according to the present disclosure, it is possible to restrict, by a simple structure, the path along which the electric wire is routed.

The present disclosure has been briefly described above. Details of the present disclosure can be clarified by reading modes (hereinafter, referred to as "embodiments") for carrying out the invention to be described below with reference to the accompanying drawings.

BRIEF DESCRIPTION OF DRAWINGS

FIG. 3 shows a state before the route restricting member is attached to an electric wire, that is, a developed state);

DESCRIPTION OF EMBODIMENTS

Hereinafter, a route restricting member 1 according to an embodiment of the present disclosure will be described with reference to the drawings.

Figure 1:
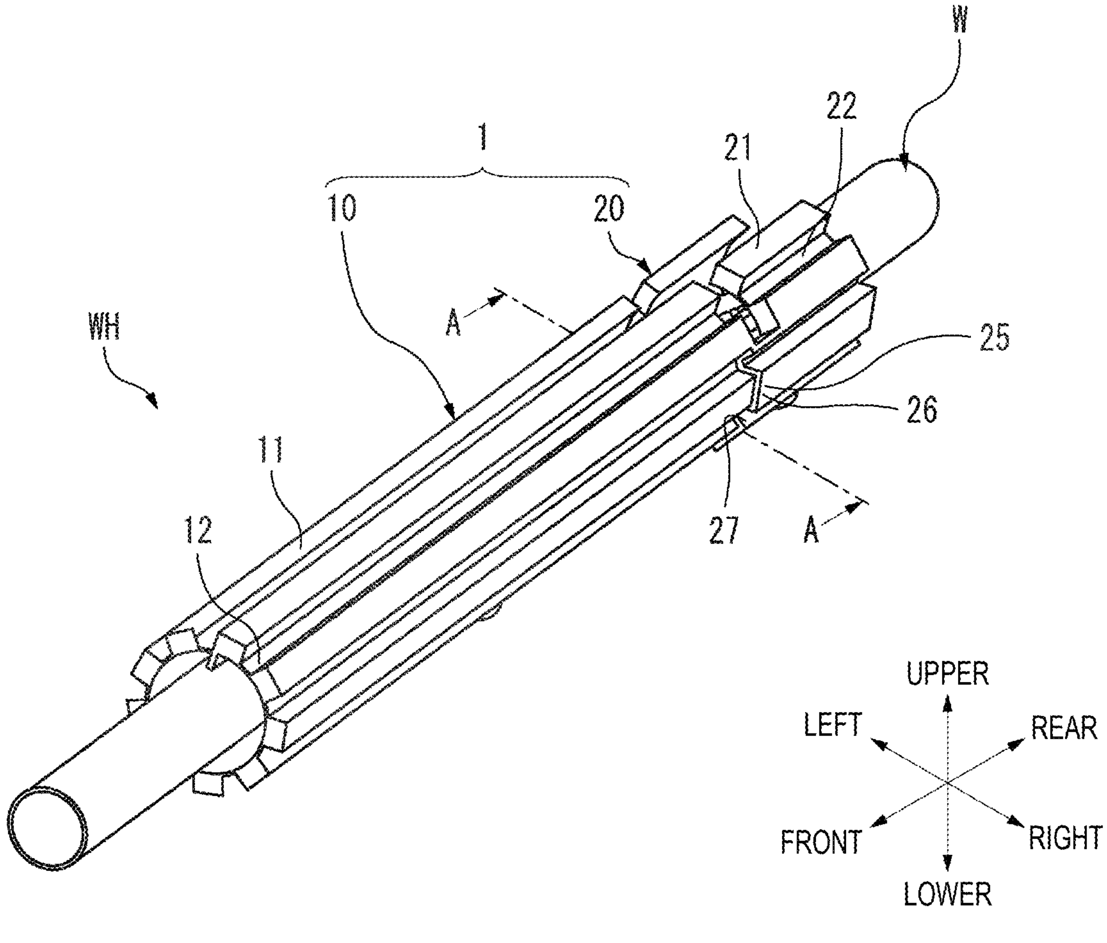
FIG. 1 is a perspective view of a wire harness including a route restricting member according to an embodiment of the present disclosure (however, for convenience of description, the route restricting member is in a state of being wound around an electric wire)
Figure 3:
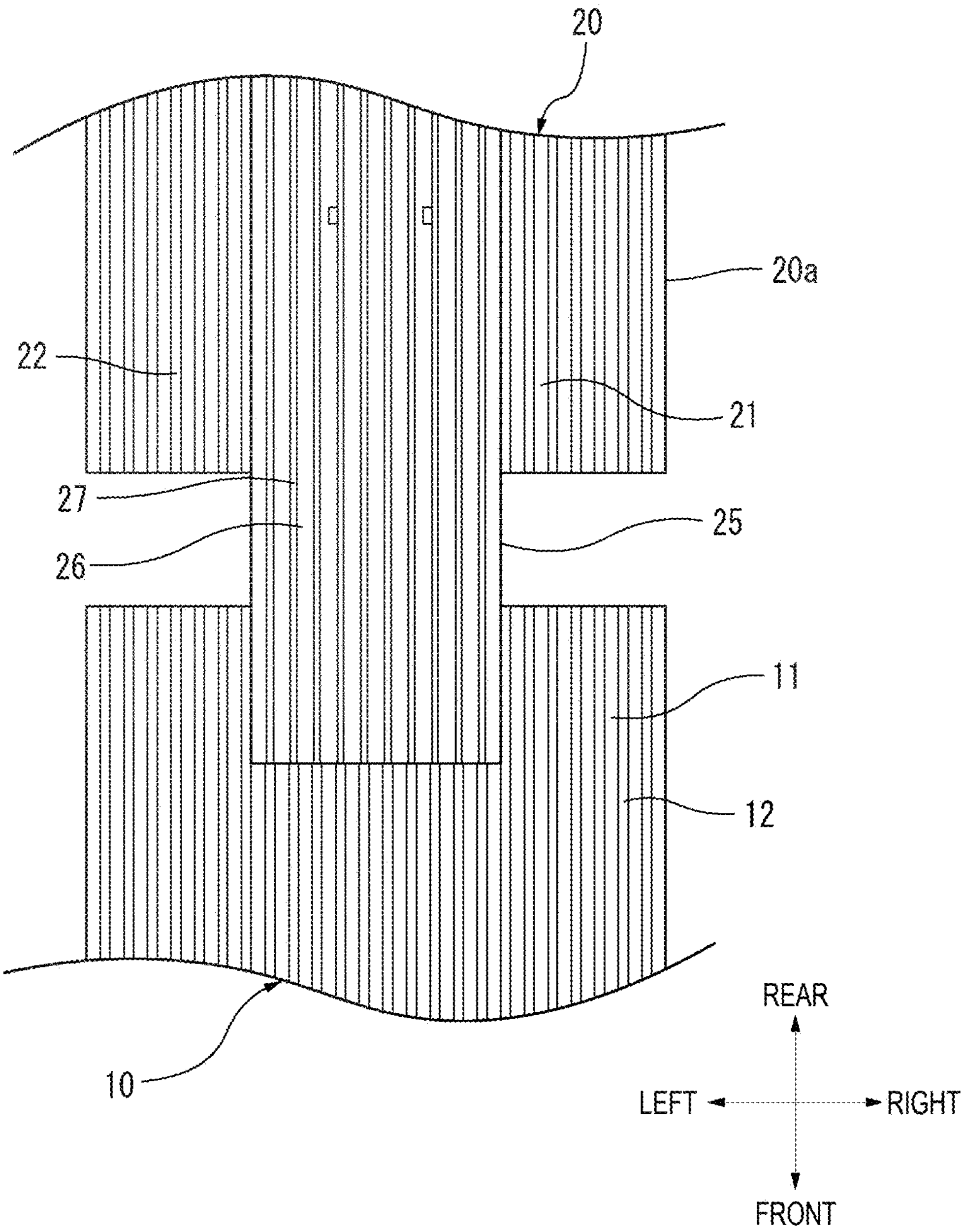
FIG. 3 is a top view of the route restricting member shown in FIG. 1 (however.
Figure 4:
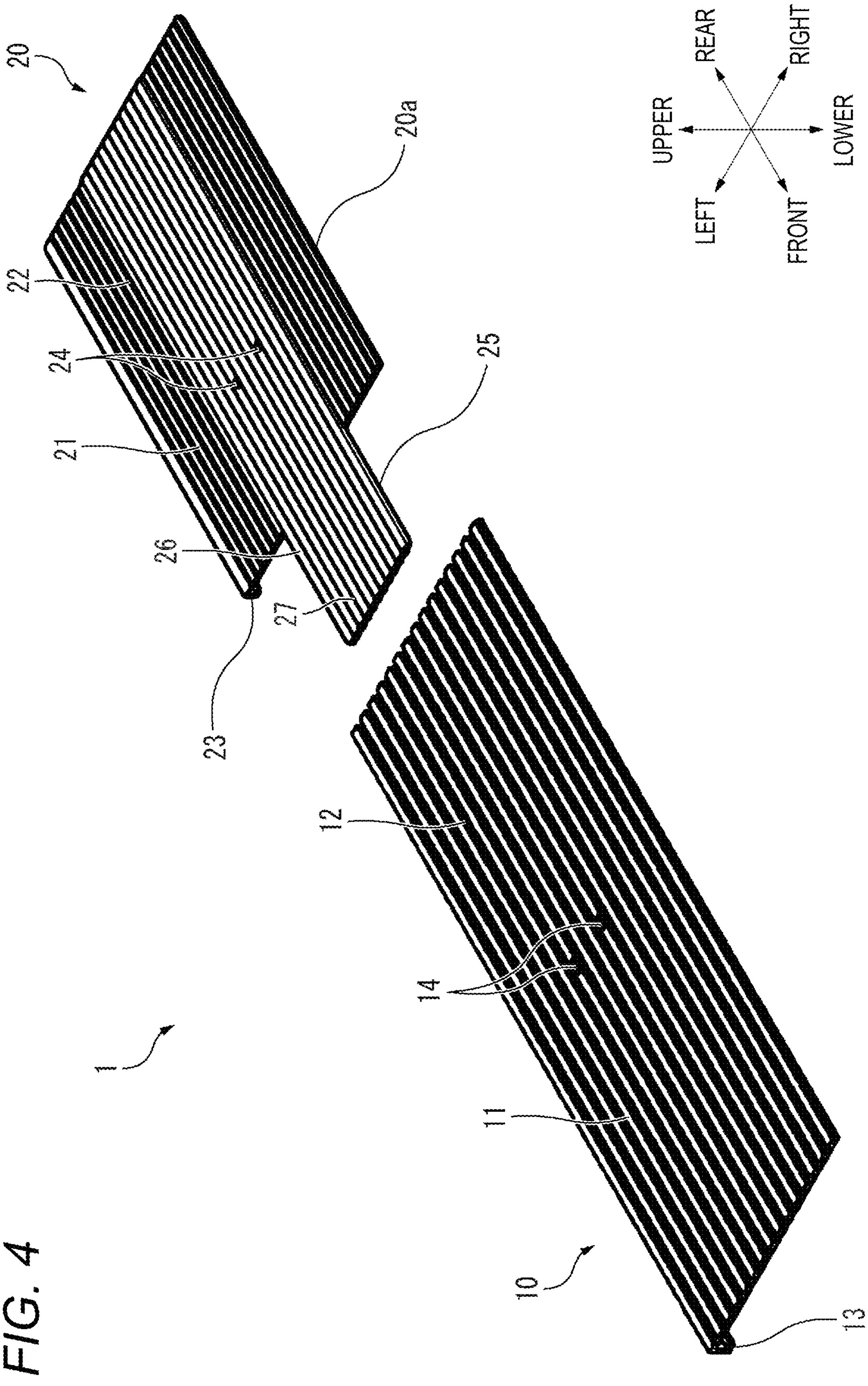
FIG. 4 is an exploded perspective view of FIG. 3.

Hereinafter, for convenience of description, "front", "rear", "left", "right", "upper", and "lower" are defined as shown in FIG. 1 or the like. A "front-rear direction", a "left-right direction", and an "upper-lower direction" are orthogonal to one another. The front-rear direction corresponds to an "axial direction" in the present disclosure. In FIGS. 3 and 4, the left-right direction corresponds to an "intersecting direction" in the present disclosure, and the upper-lower direction corresponds to a "thickness direction" in the present disclosure.

Figure 2:
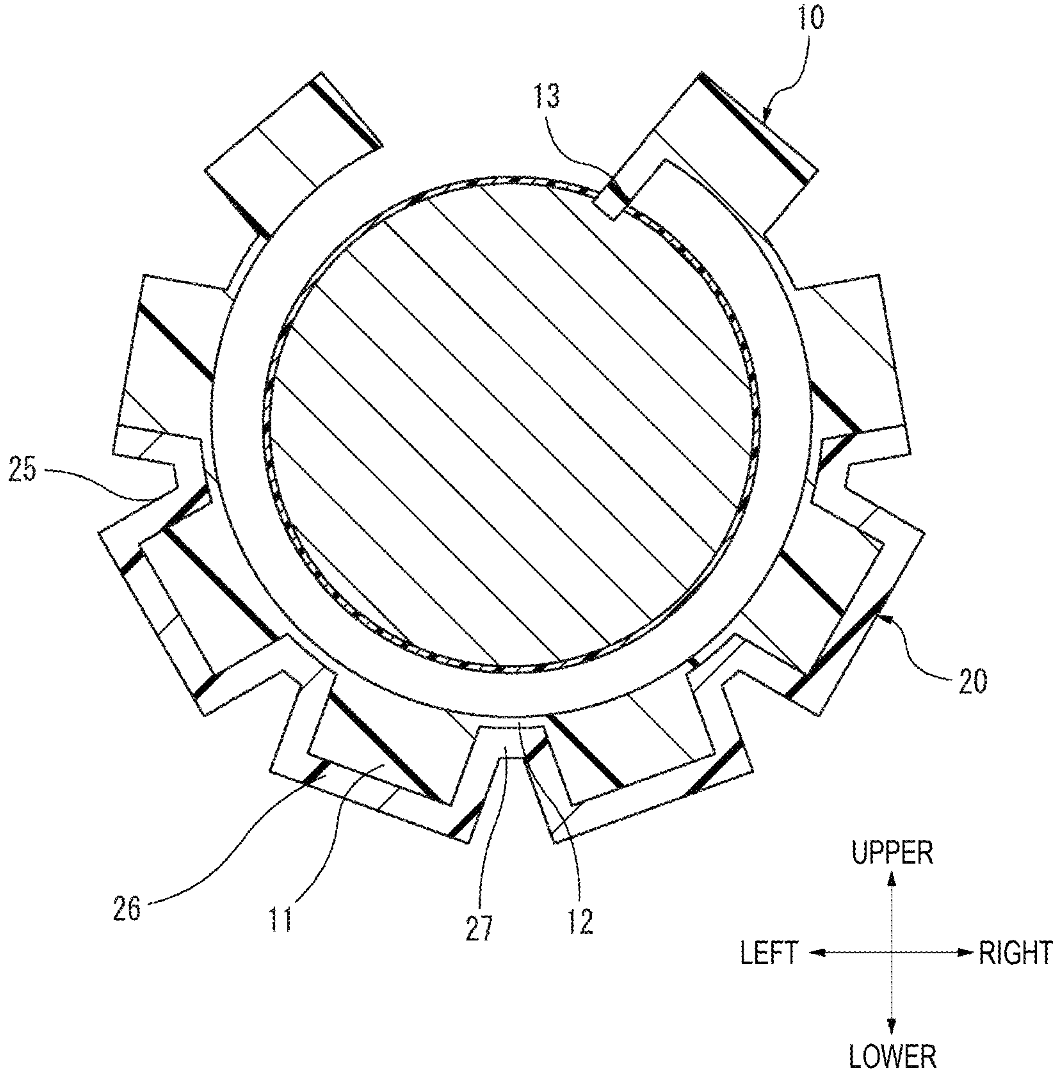
FIG. 2 is a cross-sectional view taken along a line A-A in FIG. 1.

As shown in FIGS. 1 and 2, the route restricting member 1 is wound (attached) to cover an outer periphery of an electric wire W, thereby constituting a wire harness WH together with the electric wire W. For example, the wire harness WH connects a plurality of vehicle devices (not shown) mounted on a vehicle such as an electric automatic vehicle, and is routed to pass under a floor of the vehicle. In this type of wire harness WH, the route restricting member 1 restricts a path along which the electric wire W is routed, including restricting bending of the electric wire W and the like.

As shown in FIGS. 3 and 4, the route restricting member 1 includes a sheet-shaped first sheet member 10 and a sheet-shaped second sheet member 20 fitted to the first sheet member 10. Hereinafter, the first sheet member 10 and the second sheet member 20 that constitute the route restricting member 1 will be described in order.

First, the first sheet member 10 will be described. The first sheet member 10 is wound to cover an outer periphery of a part of a predetermined portion of the electric wire W. In this example, the first sheet member 10 is a main protective sheet that protects most of the predetermined portion.

As shown in FIGS. 3 and 4, the first sheet member 10 is formed in a substantially rectangular shape that is long in the front-rear direction in a top view, and first peak portions 11 and first valley portions 12 extending in the front-rear direction are alternately connected in the left-right direction on an outer surface (an upper face in FIGS. 3 and 4) of the first sheet member 10. Meanwhile, an inner surface (a lower face in FIGS. 3 and 4) of the first sheet member 10 in contact with the electric wire W is a flat surface.

As shown in FIG. 4, a first hook portion 13 protruding downward is provided at a left end of the first sheet member 10. In a state in which attachment of the first sheet member 10 to the electric wire W is completed (that is, the first sheet member 10 is wound around the electric wire W), the first hook portion 13 is engaged by being hooked to one first peak portion 11.

As shown in FIG. 4, a plurality of (in this example, a pair of) first through holes 14 penetrating in the upper-lower direction are provided in a substantially central portion of the first sheet member 10 in the front-rear direction and the left-right direction. A binding member (not shown, for example, a band) binding the electric wire W to the first sheet member 10 is inserted into the first through holes 14 when the first sheet member 10 is attached to the electric wire W.

Next, the second sheet member 20 will be described. The second sheet member 20 is wound to cover an outer periphery of another part of the predetermined portion of the electric wire W. In this example, the second sheet member 20 is a sub (additional) protective sheet that protects a small portion of the predetermined portion.

As shown in FIGS. 3 and 4, the second sheet member 20 has a body portion **20*a* formed in a substantially rectangular shape that is long in the front-rear direction in the top view, and second peak portions 21 and second valley portions 22 extending in the front-rear direction are alternately connected in the left-right direction on an outer surface (an upper face in FIGS. 3 and 4) of the body portion 20*a*. Meanwhile, an inner surface (a lower face in FIGS. 3 and 4) of the second sheet member 20** in contact with the electric wire W is a flat surface.

In this example, since the second sheet member 20 is a sub (additional) protective sheet, a length of the body portion **20*a* in the front-rear direction is formed to be shorter than a length of the first sheet member 10** in the front-rear direction.

As shown in FIG. 4, a second hook portion 23 protruding downward is provided at a left end of the body portion **20*a* of the second sheet member 20. In a state in which attachment of the second sheet member 20 to the electric wire W is completed (that is, the second sheet member 20 is wound around the electric wire W), the second hook portion 23 is engaged by being hooked to one second peak portion 21**.

As shown in FIG. 4, a plurality of (in this example, a pair of) second through holes 24 penetrating in the upper-lower direction are provided in a substantially central portion of the body portion **20*a* of the second sheet member 20 in the front-rear direction and the left-right direction. A binding member (not shown, for example, a band) binding the electric wire W to the second sheet member 20 is inserted into the second through holes 24 when the second sheet member 20** is attached to the electric wire W.

As shown in FIGS. 1, 3, and 4, a fitting extension portion 25 that extends forward (toward the first sheet member 10) and is fitted to the outer surface of the first sheet member 10 is provided in a substantially central region of the body portion **20*a* of the second sheet member 20 in the left-right direction. As shown particularly in FIG. 2, in the fitting extension portion 25, third peak portions 26 and third valley portions 27 extending in the front-rear direction are alternately connected in the left-right direction corresponding to the first peak portions 11 and the first valley portions 12**, and are formed in a concave-convex shape when viewed in the front-rear direction.

The third peak portion 26 is a valley when viewed from an inner surface side, and the third valley portion 27 is a peak when viewed from the inner surface side (see FIG. 2). Therefore, when the fitting extension portion 25 is fitted to the outer surface of the first sheet member 10, the third peak portion 26 is fitted to the first peak portion 11, and the third valley portion 27 is fitted to the first valley portion 12. As described above, the second sheet member 20 is fitted to the first sheet member 10 by fitting the third peak portion 26 and the third valley portion 27 of the fitting extension portion 25 to the first peak portion 11 and the first valley portion 12, respectively.

The first sheet member 10 and the second sheet member 20 that constitute the route restricting member 1 have been described above. Next, an example of a method for attaching (winding) the route restricting member 1 to the electric wire W will be described. 30

First, the first sheet member 10 is disposed at a corresponding position of the electric wire W, and the electric wire W is bound to the first sheet member 10 by inserting the binding member into the first through holes 14. Thereafter, the first sheet member 10 is wound to cover the outer periphery of the electric wire W, and the first hook portion 13 is engaged by being locked to one first peak portion 11. Thus, the first sheet member 10 is attached to the electric wire W.

Next, the second sheet member 20 is disposed at a corresponding position of the electric wire W, and the electric wire W is bound to the second sheet member 20 by inserting the binding member into the second through holes 24 in a state in which the fitting extension portion 25 is fitted to the outer surface of the first sheet member 10. Thereafter, the second sheet member 20 is wound to cover the outer periphery of the electric wire W, and the second hook portion 23 is engaged by being locked to one second peak portion 21. Thus, the second sheet member 20 is attached to the electric wire W.

As a result, the route restricting member 1 is attached to the electric wire W, and the electric wire harness WH shown in FIG. 1 is completed. The example of the method for attaching (winding) the route restricting member 1 to the electric wire W has been described.

As another example of the method for attaching the route restricting member 1 to the electric wire W, for example, first, the first sheet member 10 may be fitted to the second sheet member 20, and then the first sheet member 10 and the second sheet member 20 may be collectively wound around the electric wire W. In the method for attaching the route restricting member 1 to the electric wire W, an order of the step of binding the electric wire W to the sheet members (referring to the first sheet member 10 and the second sheet member 20) and the step of winding the sheet members around the electric wire W does not matter. The order of these steps is appropriately determined.

Figure 5:
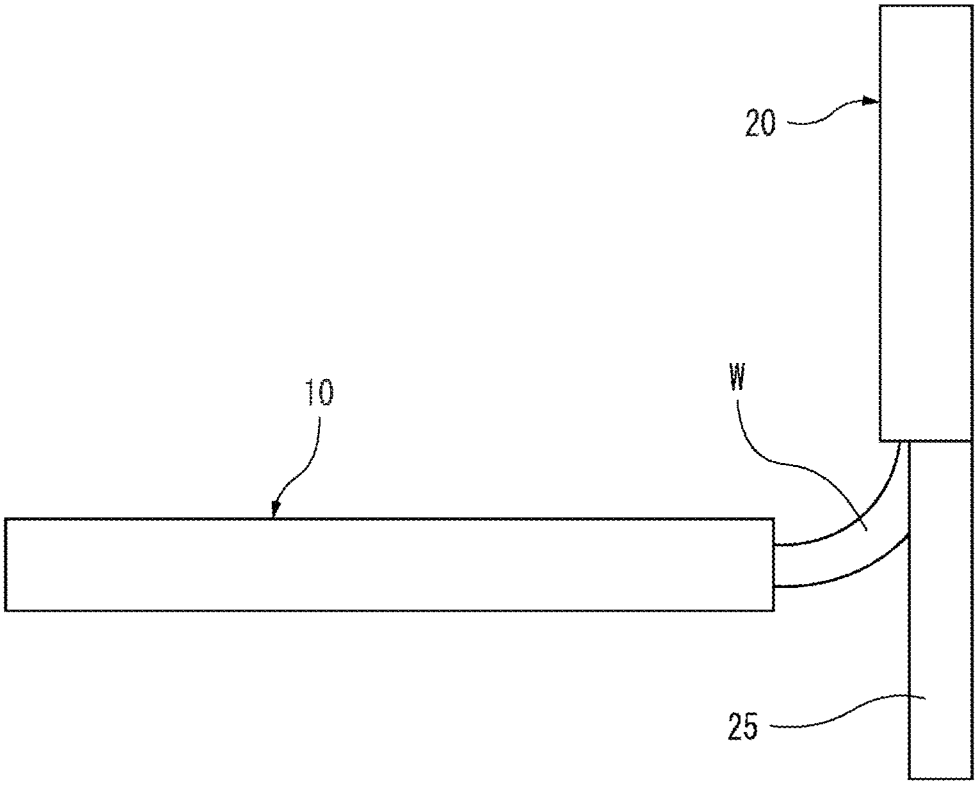
FIG. 5 is a schematic view showing an example of packing during transportation of the route restricting member.

The electric wire W to which the route restricting member 1 is attached as described above is transported to, for example, an automatic vehicle manufacturing factory or the like to be mounted on a vehicle. At this time, the electric wire W with the route restricting member 1 is packed in a packing material such as a cardboard. In general, in a case of an electric wire with a route restricting member, bending of the electric wire is restricted, and thus it is necessary to prepare a large packing material or to attach the route restricting member to the electric wire in an automatic vehicle manufacturing factory or the like. However, according to the route restricting member 1 of the present embodiment, as shown in FIG. 5, the first sheet member 10 and the second sheet member 20 can be easily disengaged as intended, and thus the electric wire W can be packed in a bent state, which makes it easier to pack the electric wire W with the route restricting member 1.

As described above, according to the present embodiment, the first peak portions 11 and the first valley portions 12 extending in the front-rear direction are alternately connected on the outer surface of the first sheet member 10, and the second peak portions 21 and the second valley portions 22 extending in the front-rear direction are alternately connected on the outer surface of the second sheet member 20. Therefore, it is possible to restrict the path along which an electric wire W is routed, including restricting bending of the electric wire W and the like. Since the outer surface of the first sheet member 10 and the outer surface of the second sheet member 20 are configured as described above, it is possible to cope with chipping from flying stones or the like by adjusting the interval between the adjacent peak portions. Since the first sheet member 10 and the second sheet member 20 are configured to be simply wound around the electric wire W, the number of components can be reduced as compared with the related art in which an exterior member and a route restricting member are provided. As described above, according to the present embodiment, it is possible to restrict, by a simple structure, the path along which the electric wire W is routed.

In addition, as described above, since the first sheet member 10 and the second sheet member 20 can be simply wound around the electric wire W, a workability of attaching the route restricting member 1 to the electric wire W is excellent, and electric wires W having different diameters can also be coped.

Further, according to the present embodiment, the second sheet member 20 is fitted to the first sheet member 10 by fitting the third peak portion 26 and the third valley portion 27 of the fitting extension portion 25 to the first peak portion 11 and the first valley portion 12 of the first sheet member 10, respectively. As described above, according to the above configuration, the first sheet member 10 and the second sheet member 20 can be fitted to each other by a simple structure, and in addition, the electric wire W with the route restricting member 1 can be easily packed as described above.

According to the present embodiment, the first sheet member 10 is provided with the first hook portion 13, and the second sheet member 20 is provided with the second hook portion 23. Therefore, it is easier to attach the route restricting member 1 to the electric wire W.

According to the present embodiment, the first through holes 14 are provided in the first sheet member 10, and the second through holes 24 are provided in the second sheet member 20. Therefore, the electric wire W can be fixed to the sheet members, and thus friction and wear of the electric wire W due to vibration can be prevented.

The present disclosure is not limited to the embodiments described above and can be appropriately modified, improved and the like. Materials, shapes, sizes, numbers, arrangement positions, and the like of components in the embodiments described above are freely selected and are not limited as long as the present disclosure can be implemented.

In the above embodiment, the route restricting member 1 includes the first sheet member 10 and the second sheet member 20, but for example, only one of the first sheet member 10 and the second sheet member 20 may be used as the route restricting member 1.

Here, features of the route restricting member according to the embodiment of the present disclosure described above are briefly summarized and listed in the following [1] to [4].

[1] The route restricting member (1) that restricts a path along which the electric wire (W) is routed, the route restricting member (1) including:

the sheet-shaped first sheet member (10) including the first peak portion (11) and the first valley portion (12) that extend in an axial direction (front-rear direction) of the electric wire (W) and are alternately connected on an outer surface in a direction (left-right direction in FIGS. 3 and 4) intersecting the axial direction, the first sheet member (10) being configured to be wound to cover an outer periphery of a part of a predetermined portion of the electric wire (W); and the sheet-shaped second sheet member (20) including the second peak portion (21) and the second valley portion (22) that extend in the axial direction and are alternately connected on an outer surface in the intersecting direction, the second sheet member (20) being configured to be wound to cover an outer periphery of another part of the predetermined portion of the electric wire (W), and being configured to be fitted to the first sheet member (10), in which the second sheet member (20) includes the fitting extension portion (25) extending toward the first sheet member (10) in the axial direction and fitted to the outer surface of the first sheet member (10).

According to the configuration of the above [1], the first peak portion and the first valley portion extending in the axial direction are alternately connected on the outer surface of the first sheet member in the intersecting direction, and the second peak portion and the second valley portion extending in the axial direction are alternately connected on the outer surface of the second sheet member in the intersecting direction. Therefore, it is possible to restrict the path along which the electric wire is routed, including restricting bending of the electric wire and the like. Since the outer surface of the first sheet member and the outer surface of the second sheet member are configured as described above, it is possible to cope with chipping from flying stones or the like, for example, when the electric wire is routed under a floor of a vehicle such as an automatic vehicle, by adjusting an interval between the adjacent peak portions. Since the first sheet member and the second sheet member are configured to be simply wound around the electric wire, the number of components can be reduced as compared with the related art in which an exterior member and a route restricting member are provided. As described above, according to the above configuration, it is possible to restrict, by a simple structure, the path along which the electric wire is routed.

[2] The route restricting member (1) according to the above [1], in which the fitting extension portion (25) includes the third peak portion (26) and the third valley portion (27) that extend in the axial direction and are connected alternately in the intersecting direction, and the third peak portion (26) and the third valley portion (27) are fitted to at least one first peak portion (11) and at least one first valley portion (12), respectively.

According to the configuration of the above [2], the second sheet member is fitted to the first sheet member by fitting the third peak portion and the third valley portion of the fitting extension portion to the first peak portion and the first valley portion of the first sheet member, respectively. As described above, according to the above configuration, the first sheet member and the second sheet member can be fitted to each other by a simple structure.

[3] The route restricting member (1) according to the above [1] or [2], in which one end of the first sheet member (10) in the intersecting direction is provided with the first hook portion (13) engaged to at least one first peak portion (11) in a state in which the first sheet member (10) is wound around the electric wire (W), and one end of the second sheet member (20) in the intersecting direction is provided with a second hook portion (23) engaged to at least one second peak portion (21) in a state in which the second sheet member (20) is wound around the electric wire (W).

According to the configuration of the above [3], the first sheet member is provided with the first hook portion, and the second sheet member is provided with the second hook portion. Therefore, it is easier to attach the route restricting member to the electric wire.

[4] The route restricting member (1) according to any one of the above [1] to [3], in which the first sheet member (10) is provided with the first through hole (14) which penetrates in a thickness direction (upper-lower direction in FIGS. 3 and 4) intersecting the axial direction and the intersecting direction and through which a binding member binding the first sheet member (10) and the electric wire (W) is able to be inserted, and the second sheet member (20) is provided with a second through hole (24) which penetrates in the thickness direction and through which a binding member binding the second sheet member (20) and the electric wire (W) is able to be inserted.

According to the configuration of the above [4], the first through hole is provided in the first sheet member, and the second through hole is provided in the second sheet member. Therefore, the electric wire can be fixed to the sheet members, and thus friction and wear of the electric wire due to vibration can be prevented.

What is claimed is:

1. A route restricting member that restricts a path along which an electric wire is routed, the route restricting member comprising:

a sheet-shaped first sheet member including a first peak portion and a first valley portion that extend in an axial direction of the electric wire and are alternately connected on an outer surface in a direction intersecting the axial direction, the first sheet member being wound to cover an outer periphery of a part of a predetermined portion of the electric wire; and a sheet-shaped second sheet member including a second peak portion and a second valley portion that extend in the axial direction and are alternately connected on an outer surface in the intersecting direction, the second sheet member being wound to cover an outer periphery of another part of the predetermined portion of the electric wire, and being fitted to the first sheet member, wherein the second sheet member includes a fitting extension portion extending toward the first sheet member in the axial direction and fitted to the outer surface of the first sheet member.

2. The route restricting member according to claim 1, wherein the fitting extension portion includes a third peak portion and a third valley portion that extend in the axial direction and are connected alternately in the intersecting direction, and the third peak portion and the third valley portion are fitted to at least one first peak portion and at least one first valley portion, respectively.

3. The route restricting member according to claim 1, wherein one end of the first sheet member in the intersecting direction is provided with a first hook portion engaged to at least one first peak portion in a state in which the first sheet member is wound around the electric wire, and one end of the second sheet member in the intersecting direction is provided with a second hook portion engaged to at least one second peak portion in a state in which the second sheet member is wound around the electric wire.

4. The route restricting member according to claim 1, wherein the first sheet member is provided with a first through hole which penetrates in a thickness direction intersecting the axial direction and the intersecting direction and through which a binding member binding the first sheet member and the electric wire is able to be inserted, and the second sheet member is provided with a second through hole which penetrates in the thickness direction and through which a binding member binding the second sheet member and the electric wire is able to be inserted.

* * * * *